United States Patent
Torbett et al.

(10) Patent No.: US 11,143,021 B2
(45) Date of Patent: Oct. 12, 2021

(54) RESONANT RECEIVER FOR ELECTROMAGNETIC TELEMETRY

(71) Applicant: Halliburton Energy Services, Inc., Houston, TX (US)

(72) Inventors: Patrick William Torbett, Geary, OK (US); David Lyle, Norman, OK (US); John Kenneth Snyder, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/753,154

(22) PCT Filed: Nov. 9, 2018

(86) PCT No.: PCT/US2018/060028
§ 371 (c)(1),
(2) Date: Apr. 2, 2020

(87) PCT Pub. No.: WO2019/112753
PCT Pub. Date: Jun. 13, 2019

(65) Prior Publication Data
US 2020/0291769 A1 Sep. 17, 2020

Related U.S. Application Data

(60) Provisional application No. 62/595,716, filed on Dec. 7, 2017.

(51) Int. Cl.
*H04B 13/02* (2006.01)
*E21B 47/13* (2012.01)
(Continued)

(52) U.S. Cl.
CPC .............. *E21B 47/13* (2020.05); *E21B 33/03* (2013.01); *H04B 1/10* (2013.01)

(58) Field of Classification Search
CPC .......... E21B 47/13; E21B 33/03; H04B 1/10; H04B 1/1027
(Continued)

(56) References Cited

U.S. PATENT DOCUMENTS 5,512,889 A * 4/1996 Fletcher .................. E21B 47/13
340/854.6
6,239,675 B1 * 5/2001 Flaxl ................ G06K 19/07767
334/55
(Continued)

FOREIGN PATENT DOCUMENTS

WO 2015077552 5/2015

OTHER PUBLICATIONS

International Application No. PCT/US2018/060028, "International Search Report and Written Opinion", dated Feb. 25, 2019, 16 pages.

*Primary Examiner* — Tanmay K Shah
(74) *Attorney, Agent, or Firm* — Kilpatrick Townsend & Stockton LLP

(57) ABSTRACT

A resonant receiver for electromagnetic telemetry of wellbore-related data can be used to improve signal reception for transmitting or receiving low-amplitude downhole signals that include noise. A system can comprise a surface assembly with an antenna for wirelessly communicating signals with equipment positioned downhole in a wellbore. The surface assembly can comprise an amplifier and a tank circuit operable to resonate at a resonant frequency to pass a received signal at the resonant frequency to the amplifier while also shunting noise outside of the resonant frequency to ground. In some embodiments, a downhole transceiver in wireless communication with the surface assembly can comprise a similar tank circuit and amplifier.

20 Claims, 8 Drawing Sheets

(51) Int. Cl.
 *E21B 33/03* (2006.01)
 *H04B 1/10* (2006.01)
(58) Field of Classification Search
 USPC .................................................... 340/854.6
 See application file for complete search history.

(56) References Cited

U.S. PATENT DOCUMENTS

2012/0201175 A1\* 8/2012 Vazny ...................... H04B 1/18
 370/278
2014/0216816 A1\* 8/2014 Lehr ........................ E21B 34/06
 175/40

\* cited by examiner

RESONANT RECEIVER FOR ELECTROMAGNETIC TELEMETRY

CROSS-REFERENCE TO RELATED APPLICATION

This disclosure claims priority to U.S. Provisional Patent Application No. 62/595,716, titled "Resonant Receiver for Electromagnetic Telemetry" and filed Dec. 7, 2017, the entirety of which is incorporated herein by reference.

TECHNICAL FIELD

The present disclosure relates to devices usable in connection with a wellbore environment. More specifically, this disclosure relates to a resonant receiver for electromagnetic telemetry of wellbore-related data.

BACKGROUND

Downhole tools can transmit and receive signals using electromagnetic ("EM") telemetry. The signals can represent information about a wellbore environment or instructions for implementing wellbore production and completion processes. EM telemetry can involve detecting weak signals. Noise in EM signals can negatively affect the ability of a receiver to detect and process the EM signals. A downhole environment can be particularly challenging and unpredictable with a variety of sources of noise that can negatively affect the ability of an EM telemetry system to communicate data. For example, an operating rig may introduce noise into the EM signals transmitted or received with a downhole tool through casing tubing in a subterranean formation. Additionally, a downhole environment can include subterranean formations having higher resistance that can attenuate EM signals. For example, a subterranean formation can reduce signal strength of an EM signal due to high resistivity, making any signal transmitted or received downhole more difficult to isolate for processing purposes.

DETAILED DESCRIPTION

Figure 1:
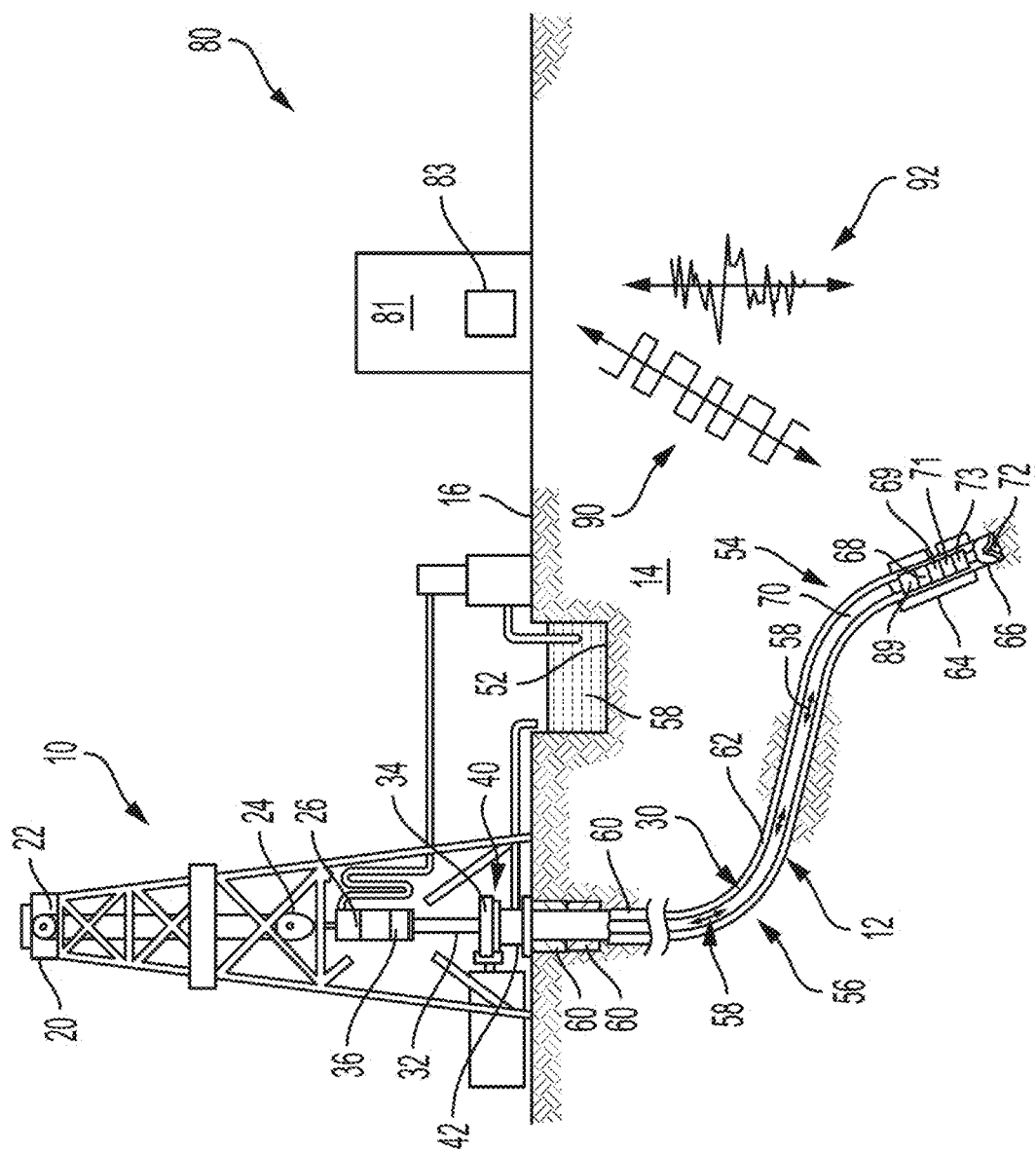
FIG. 1 is a cross-sectional view of a land-based drilling system incorporating an EM telemetry communication system according to one aspect of the present disclosure.

Certain aspects and features relate to a receiver with a resonant circuitry that can create a high quality factor to reduce noise and enhance electromagnetic ("EM") signal reception and processing. An EM telemetry system can establish a two-way communications link between devices. For example, in an application in a wellbore, EM telemetry can establish a two-way communications link between the surface and a tool downhole. Using low-frequency electromagnetic wave propagation, an EM telemetry system can facilitate high-speed data transmission to and from the surface through any formation. Data formats can be customized to suit the drilling needs of the particular well. A resonant receiver, or resonant circuit, of an EM telemetry system can be used to detect downhole EM signals operating at specific frequencies while reducing the effect of noise on the EM signals, where that noise is propagating over other frequencies. Using a resonant receiver according to some examples of the present disclosure can improve signal reception for transmitting or receiving downhole signals that include noise.

In some examples, an EM telemetry system can include a resonant circuit (e.g., a "tank" circuit, LC circuit), a low-noise amplifier, and a bandpass filter for reducing unwanted noise and isolating a signal transmitted to or received from a downhole tool with EM communication capabilities. A resonant circuit can be used to resonate at a resonant frequency. Resonating at a specific frequency can allow the circuit to operate similarly to an open circuit, where the high impedance of the circuit can maximize the gain of the signal at that resonant frequency. A low-noise amplifier can be included within an EM telemetry system to amplify the EM signals, which can be weak signals inherently. For example, EM signals can operate at extremely low frequencies, such as frequencies below 20 Hz. The low-noise amplifier can be used to amplify EM signals after being isolated by the resonant circuit. After being amplified by a low-noise amplifier, a bandpass filter can be used to further increase the magnitude of the received EM signal while reducing noise, therefore increasing the signal-to-noise ratio ("SNR"). An EM telemetry system including these components can further isolate and identify an EM signal operating at a specific frequency and eliminate noise for improved signal processing.

An EM telemetry system can have many applications, including making underbalanced drilling more cost-effective, especially when drilling with air or gasified drilling fluids, in which conventional mud pulse telemetry systems may not function. EM telemetry systems EM telemetry can provide faster communication, which can reduce drilling time. Radio commands to a downhole tool can be accomplished via a dipole antenna, so pump cycling timing schemes may not be required. Implementing an EM telemetry system can also be less expensive to maintain as compared to other downhole communication systems. For example, an EM telemetry system may not involve mechanical parts that move, and any new components for an EM telemetry system can be installed at a surface of a wellbore environment without making alterations to existing downhole tools. However, EM telemetry can be sensitive to noise along a signal propagation path, and subterranean formations with high impedance may weaken a transmitted or received EM signal. By implementing EM telemetry with resonant circuitry, EM telemetry signals can be more readily identifiable by eliminating unwanted noise that may otherwise make signal processing difficult or unviable.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of a land-based drilling system incorporating an EM telemetry system according to one example. Wellbore drilling and production system 10 can be used to produce hydrocarbons from wellbore 12 extending through various earth strata in an oil and gas formation 14 (e.g., subterranean formation) located below the earth's surface 16. Wellbore 12 may be formed of a single bore or multiple bores extending into the formation 14, and disposed in any orientation. Wellbore drilling and production system 10 includes a derrick or drilling rig 20. Drilling rig 20 may include a hoisting apparatus 22, a travel block 24, and a swivel 26 for raising and lowering casing, drill pipe, coiled tubing, production tubing, other types of pipe or tubing strings or other types of conveyance vehicles, such as wireline, slickline, and the like. Conveyance vehicle that is the drill string 30 in FIG. 1 is a substantially tubular, axially extending drill string formed of a drill pipe joints coupled together end-to-end. Drilling rig 20 may include a kelly 32, a rotary table 34, and other equipment associated with rotation or translation of drill string or drill string 30 within a wellbore 12. For some applications, drilling rig 20 may also include a top drive unit 36. Drilling rig 20 may be located proximate to a wellhead 40, as shown in FIG. 1, or spaced apart from wellhead 40, such as in the case of an offshore arrangement. One or more pressure control devices 42, such as blowout preventers ("BOPs") and other equipment associated with drilling or producing a wellbore may also be provided at wellhead 40 or elsewhere in the wellbore drilling and production system 10. Although wellbore drilling and production system 10 of FIG. 1 is illustrated as being a land-based drilling system, wellbore drilling and production system 10 may be deployed offshore.

A working or service fluid source 52 may supply a working fluid 58 pumped to the upper end of drill string 30 and flow through drill string 30. Working fluid source 52 may supply any fluid utilized in wellbore operations, including without limitation, drilling fluid, cementious slurry, acidizing fluid, liquid water, steam or some other type of fluid. Wellbore 12 may include subsurface equipment 54 disposed therein, such as, for example, a drill bit and bottom hole assembly ("BHA"), a completion assembly or some other type of wellbore tool.

Wellbore drilling and production system 10 may have a pipe system 56. For purposes of this disclosure, pipe system 56 may include casing, risers, tubing, drill strings, completion or production strings, subs, heads or any other pipes, tubes or equipment that attaches to the foregoing, such as drill string 30, as well as the wellbore and laterals in which the pipes, casing and strings may be deployed. In this regard, pipe system 56 may include one or more casing strings 60 cemented in wellbore 12, such as the surface, intermediate, and production casing 60 shown in FIG. 1. An annulus 62 is formed between the walls of sets of adjacent tubular components, such as concentric casing strings 60 or the exterior of drill string 30 and the inside wall of wellbore 12 or casing string 60, as the case may be.

Where subsurface equipment 54 is used for drilling and conveyance vehicle is a drill string 30, the lower end of drill string 30 may include bottom hole assembly 64, which may carry at a distal end a drill bit 66. During drilling operations, weigh-on-bit ("WOB") is applied as drill bit 66 is rotated, thereby enabling drill bit 66 to engage formation 14 and drill wellbore 12 along a predetermined path toward a target zone. In general, drill bit 66 may be rotated with drill string 30 from drilling rig 20 with top drive unit 36 or rotary table 34, or with a downhole mud motor 68 within bottom hole assembly 64. The working fluid 58 may be pumped to the upper end of drill string 30 and flow through the longitudinal interior 70 of drill string 30, through bottom hole assembly 64, and exit from nozzles formed in drill bit 66. At bottom end 72 of wellbore 12, working fluid 58 may mix with formation cuttings, formation fluids and other downhole fluids and debris. The drilling fluid mixture may then flow upwardly through an annulus 62 to return formation cuttings and other downhole debris to the surface 16.

Bottom hole assembly 64 or drill string 30 may include various other tools, including a power source 69, mechanical subs 71 such as directional drilling subs, and measurement equipment 73, such as measurement while drilling (MWD) and/or logging while drilling (LWD) instruments, sensors, circuits, or other equipment to provide information about wellbore 12 or formation 14, such as logging or measurement data from wellbore 12.

Measurement data and other information from the tools may be communicated using electrical signals, acoustic signals or other telemetry that can be converted to electrical signals at the drilling rig 20 to, among other things, monitor the performance of drill string 30, bottom hole assembly 64, and associated drill bit 66, as well as monitor the conditions of the environment to which the bottom hole assembly 64 is subjected.

Shown deployed in FIG. 1 is an electromagnetic (EM) telemetry system 80 using capacitive electrodes according to some examples. EM telemetry system 80 includes a surface assembly 81 having a counter electrode 83 and a downhole transceiver 89. EM telemetry system 80 allows for communication between surface assembly 81 and downhole transceiver 89. For example, EM telemetry system 80 may allow communication between a control or data acquisition module coupled to surface assembly 81 and downhole equipment or sensor(s) coupled to downhole transceiver 89. In one or more examples, EM telemetry system 80 may be bidirectional; that is, one or both of surface assembly 81 and downhole transceiver 89 may be configured as a transmitter or a receiver of EM telemetry system 80 at a given time. Any suitable duplexing technique may be utilized, such as time division duplexing, frequency division duplexing, or the like. In one or more examples, EM telemetry system 80 may be unidirectional.

Encoded signal 90 can be a time-varying electromagnetic field that carries information between surface assembly 81 and downhole transceiver 89. For example, encoded signal 90 may carry measurement or logging data acquired by one or more downhole tools. The data can be transmitted to the surface for further processing. Because encoded signal 90 may be transmitted and received during drilling operation, EM telemetry system 80 is suitable for drilling, measurement-while-drilling (MWD), and logging-while-drilling applications. For example, the encoded signal 90 may carry measurement data, logging data, or instructions for drilling tools, such as directions used for directional drilling applications. The information carried by encoded signal 90 may be in a digital format or analog format. Accordingly, any suitable digital or analog encoding or modulation schemes may be employed to achieve reliable and secure high-speed communication between downhole transceiver 89 and surface assembly 81. Examples of the encoding and modulation scheme may include pulse width modulation, pulse position modulation, on-off keying, amplitude modulation, frequency modulation, single-side-band modulation, frequency shift keying, phase shift keying (e.g., binary phase shift keying or M-ary phase shift keying), discrete multi-tone, orthogonal frequency division multiplexing, and the like. In one or more examples, encoded signal 90 may have a frequency range between 1 Hz and 50 Hz and a nominal data rate of between 3 and 12 bits per second.

When EM telemetry system 80 operates with downhole transceiver 89 as the transmitter and surface assembly 81 as the receiver, encoded signal 90 is generated by applying a voltage signal across a gap in downhole transceiver 89. For example, the gap may electrically insulate drill bit 66 from drill string 30. More generally, the gap electrically insulates a portion of wellbore drilling and production system 10 that is electrically coupled to wellhead 40 from a portion of wellbore drilling and production system 10 that is electrically coupled to formation 14. In one or more examples, the applied voltage signal may have a strength of approximately 3 V (e.g., a level between 0.5 V and 5 V). Encoded signal 90 propagates through the earth and drill string 30 to surface assembly 81. At the surface, counter electrode 83 measures a voltage signal corresponding to encoded signal 90, the voltage signal being determined based on a differential voltage between counter electrode 83 and wellhead 40. The measured voltage signal is demodulated and decoded to recover the information carried by encoded signal 90. In one or more examples, the measured voltage signal may have a strength of approximately 10 μv. Similarly, when EM telemetry system 80 operates with surface assembly 81 as the transmitter and downhole transceiver 89 as the receiver of encoded signal 90, encoded signal 90 is transmitted by applying a voltage signal between counter electrode 83 and wellhead 40. A corresponding voltage signal across the gap in downhole transceiver is measured, demodulated, and decoded to recover the information carried by encoded signal 90.

Although encoded signal 90 is ideally transmitted and received without noise, in practice the received voltage signal is noisy. One source of noise in EM telemetry system 80 is telluric noise, which is depicted in FIG. 1 as a telluric noise signal 92. Telluric noise is induced by telluric currents induced by geomagnetic pulsations or atmospheric pulsations (e.g., lightning or radio atmospheric signals known as "sferics"). Telluric currents span a wide range of frequencies. Telluric currents from geomagnetic pulsations span frequencies from 1 mHz to a few Hz (e.g., 1 mHz to 10 Hz), and atmospheric pulsations span frequencies above 1 Hz (e.g., 100 Hz). The magnetic fields associated with telluric currents can be slowly varying spatially, and may be assumed to be constant, or approximately constant, over a large distance (e.g., at least 10 km). Other sources of noise include the architecture of the system, downhole noises outputting harmonic signals, and other sources.

One or both of the surface assembly 81 and downhole transceiver 89 can include circuitry that can reduce noise and enhance EM telemetry signal processing.

Figure 2:
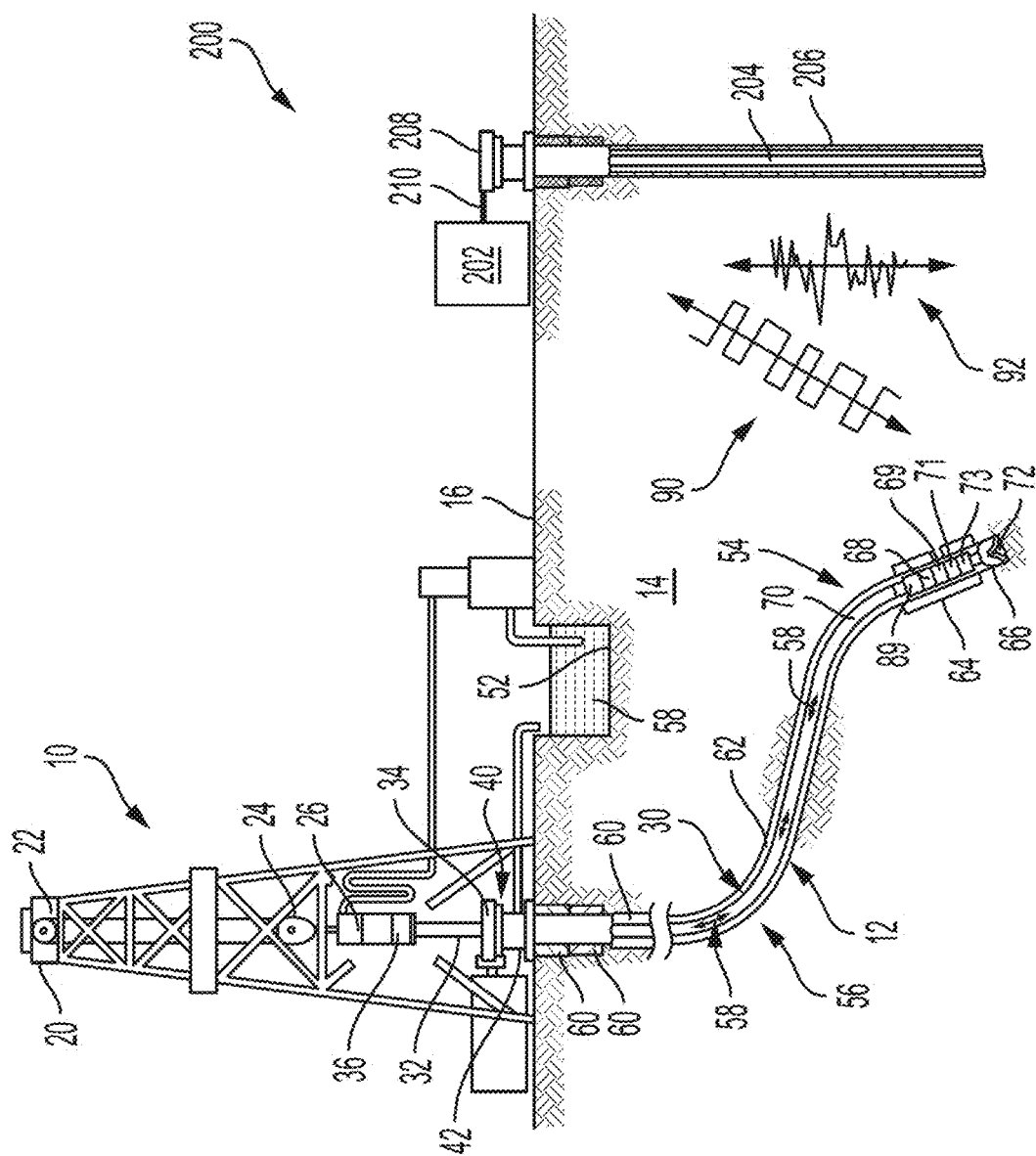
FIG. 2 is a cross-sectional view of a land-based drilling system incorporating an EM telemetry communication system using a completed well casing as an antenna according to one aspect of the present disclosure.

FIG. 2 is a cross-sectional view of a land-based drilling system incorporating an EM telemetry system 200 using a completed well casing 204 as an antenna according to one example. In some examples, the completed well casing of one wellbore environment can be used as an antenna to receive EM signals from a proximate wellbore environment. The ability to obtain an EM signal on a completed well off the drilling location removes the common issues such as top drive noise, draw-works noise, transient noise, and various machinery noise. For example, by transmitting or receiving an EM signal through a completed well casing 204 acting as an antenna, noise generated by tools and process occurring at the wellbore drilling and production system 10 can be minimized.

As shown in FIG. 2, a wellbore drilling and production system 10 is implemented similarly according to the description of FIG. 1. EM telemetry system 200 can include a surface assembly 202, and a downhole transceiver 89. The completed well casing 204 can be located proximate to the wellbore 12 within the formation 14. The completed well casing 204 can be located within a wellbore 206 that has entered its completion or post-production phase. The completed well casing 204 can be used as an antenna to transmit or receive EM signals between the downhole transceiver 89 and a surface assembly 202. The length of the completed well casing 204, being electrically conductive in nature, can communicate EM signals being propagated throughout the formation 14. Using the completed well casing 204 as an antenna can reduce the amount of unwanted noise and can reduce the dampening effect on an EM signal's amplitude caused by high-impedance formations.

EM telemetry system 200 allows for communication between surface assembly 202 and downhole transceiver 89. For example, EM telemetry system 200 may allow communication between a control or data acquisition module coupled to surface assembly 202 and downhole equipment or sensor(s) coupled to downhole transceiver 89. In one or more examples, EM telemetry system 200 may be bidirectional; that is, one or both of surface assembly 202 and downhole transceiver 89 may be configured as a transmitter or a receiver of EM telemetry system 80 at a given time. Any suitable duplexing technique may be utilized, such as time division duplexing, frequency division duplexing, or the like. In one or more examples, EM telemetry system 200 may be unidirectional.

As depicted in FIG. 2, the surface assembly 202 can be electrically connected to the wellhead 208 via a conduit 210. The conduit 210 can be a conductive cable capable of transmitting analog and digital signals, such as a shielded wire or twisted pair cable. The conduit 210 can transfer an EM signal from the completed well casing 204 through the wellhead 208 to the surface assembly 202, and vice versa.

EM telemetry system 200 can be suitable for drilling, measurement-while-drilling (MWD), and logging-while-drilling applications, similar to EM telemetry system 80 as described in FIG. 1. Accordingly, any suitable digital or analog encoding or modulation schemes may be employed to achieve reliable and secure high-speed communication between downhole transceiver 89 and surface assembly 202.

When EM telemetry system 200 operates with downhole transceiver 89 as the transmitter and surface assembly 202 as the receiver, encoded signal 90 is generated by applying a voltage signal across a gap in downhole transceiver 89. The encoded signal 90 can be transmitted onto the completed well casing 204 through the formation 14, to the wellhead 208, and through the conduit 210 to the surface assembly 202. The received signal is demodulated and decoded to recover the information carried by encoded signal 90. Similarly, when EM telemetry system 200 operates with surface assembly 202 as the transmitter and downhole transceiver 89 as the receiver of encoded signal 90, encoded signal 90 is transmitted through the conduit 210 to the wellhead 208, along the length of the completed well casing 204, and through the formation 14 to the downhole transceiver 89. A voltage signal across the gap in downhole transceiver 89 is measured, demodulated, and decoded to recover the information carried by encoded signal 90.

One or both of the surface assembly 202 and downhole transceiver 89 can include circuitry that can reduce noise and enhance EM telemetry signal processing.

In some examples, a second antenna can be inserted into the surface 16 adjacent to the wellhead 208. This second antenna can be used to transmit or receive EM signals similarly to the completed well casing 204, such that the second antenna can transfer EM signals throughout the formation 14. The EM signals from the downhole transceiver 89 received by surface assembly 202 via the second antenna can be compared to EM signals received by the surface assembly 202 via the completed well casing 204. Comparing two sets of received EM signals can allow for additional identification and isolation of ambient noise. For example, the EM signals received from the completed well casing 204 can have higher amplitude with lower noise than the EM signals received from the second antenna. The EM signals received from the second antenna, being more susceptible to noise and amplitude reductions, can be analyzed to identify and isolate common noise frequencies.

Figure 3:
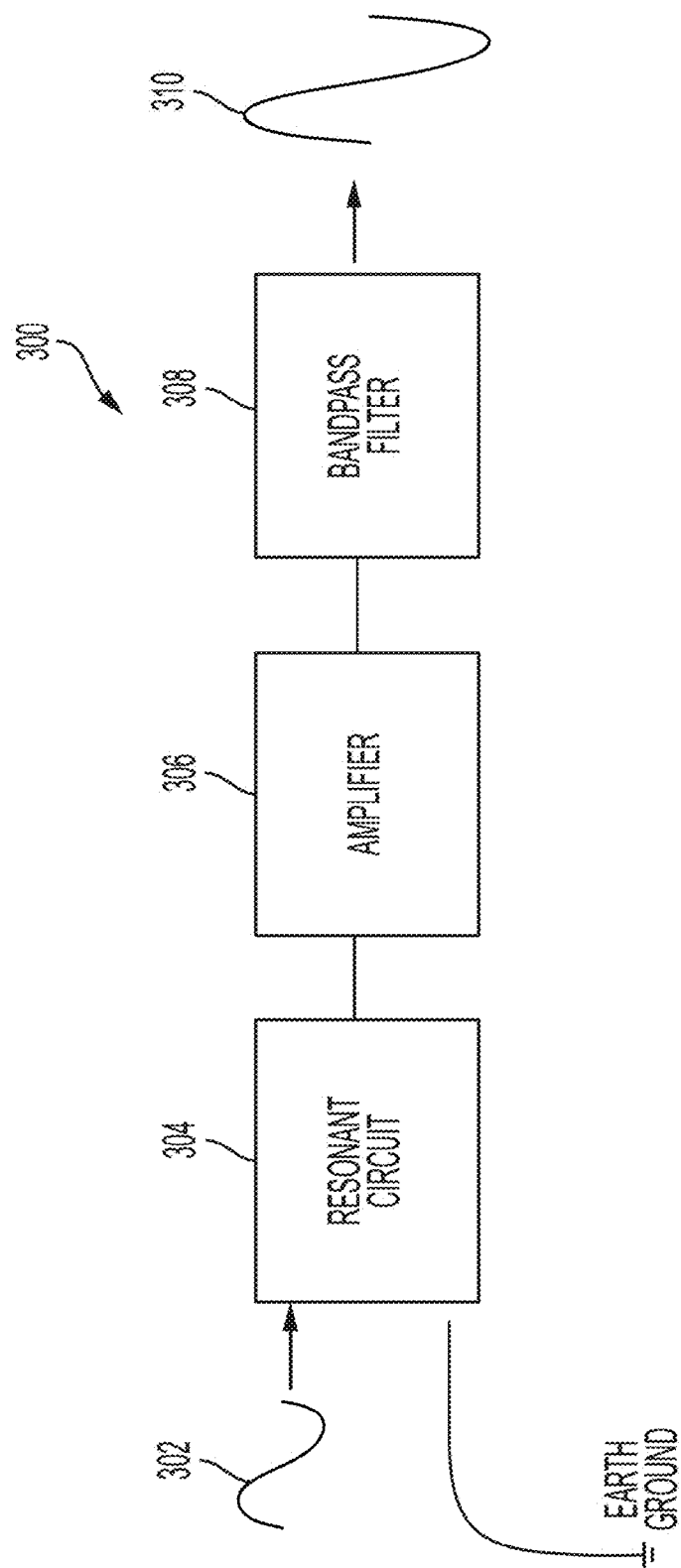
FIG. 3 is a block diagram of circuitry that can be included in one or both of a surface assembly or a downhole transceiver in an EM telemetry system according to one aspect of the present disclosure.

FIG. 3 is a block diagram of circuitry 300 that can be included in one or both of a surface assembly or a downhole transceiver in an EM telemetry communication system according to one example. The circuitry 300 can include a resonant circuit 304, an amplifier 306, and a bandpass filter 308. The circuitry 300 can be connected to an earth ground to shunt off noise via the resonant circuit 304.

A raw EM signal 302 can be used as input to the resonant circuit 304. The resonant circuit 304 can be used to resonate at a resonant frequency, allowing the resonant circuit 304 to maximize the gain of the raw EM signal 302 at that resonant frequency while ignoring noise at other frequencies. The cleaned EM signal can be transmitted by the resonant circuit 304 to the amplifier 306, which can be a high-gain, low-noise amplifier. The amplifier 306 can amplify the cleaned EM signal to a sufficient amplitude for processing the cleaned EM signal. The amplifier 306 can transmit the amplified EM signal to the bandpass filter 308. The bandpass filter 308 can be used to further increase the magnitude and reduce noise of the amplified EM signal. The bandpass filter 308 can then transmit a final EM signal 310 that can be used for processing, such as demodulating and decoding the EM signal to recover encoded information.

The output of the bandpass filter 308, the final EM signal 310, is the amplified EM signal with noise minimized. For example, a noise level measurement at a gain of 40 dB can be −163 dB to −168 dB over a frequency range of 2 Hz to 20 Hz. This noise level measurement can be roughly 10 dB to 20 dB lower than if the circuitry 300 was not implemented within an EM telemetry system.

Figure 4:
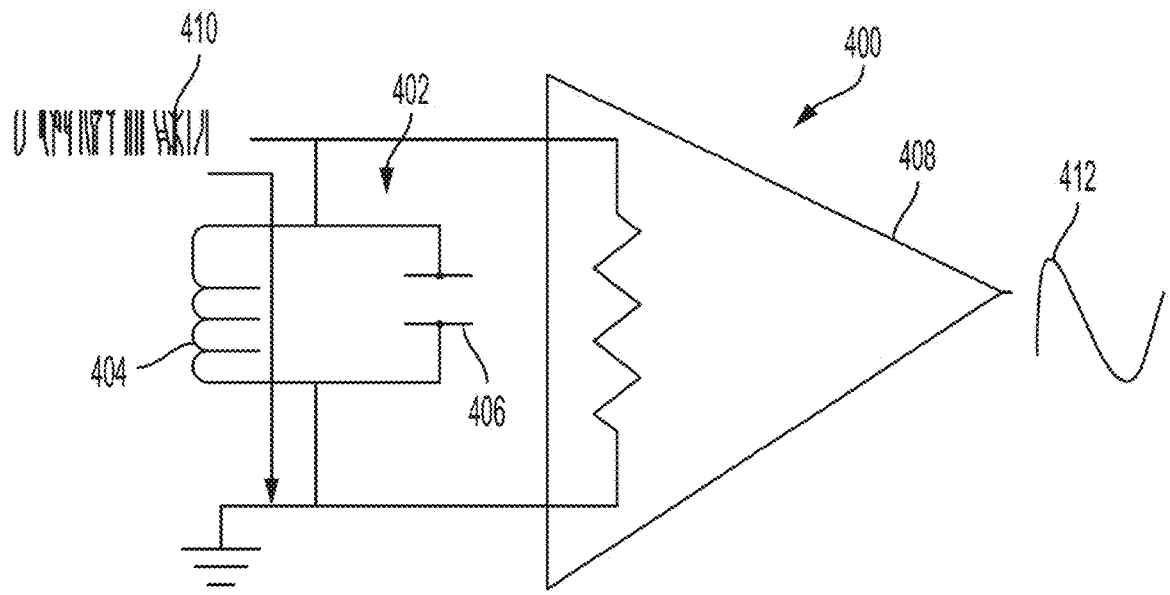
FIG. 4 is a schematic diagram of circuitry for filtering noise that can be included in one or both of a surface assembly or a downhole transceiver in an EM telemetry communication system according to one aspect of the present disclosure.

FIG. 4 is a schematic diagram of circuitry 400 for filtering noise 410 that can be included in one or both of a surface assembly or a downhole transceiver in an EM telemetry communication system according to one example. The circuitry 400 can include an amplifier 408 and a resonant circuit 402, or tank circuit. The resonant circuit 402 can include an inductor 404 and a capacitor 406 coupled in parallel to operate at a desired frequency. The resonant circuit 402 circuit can provide low impedance for noise 410 that is outside a resonant frequency, which can result in the resonant circuit 402 shunting the noise 410 to ground, as illustrated by the arrow shown in FIG. 4*a*. The output of the amplifier can be the output EM signal 412 without the noise 410 that is outside of a resonant frequency.

Figure 5:
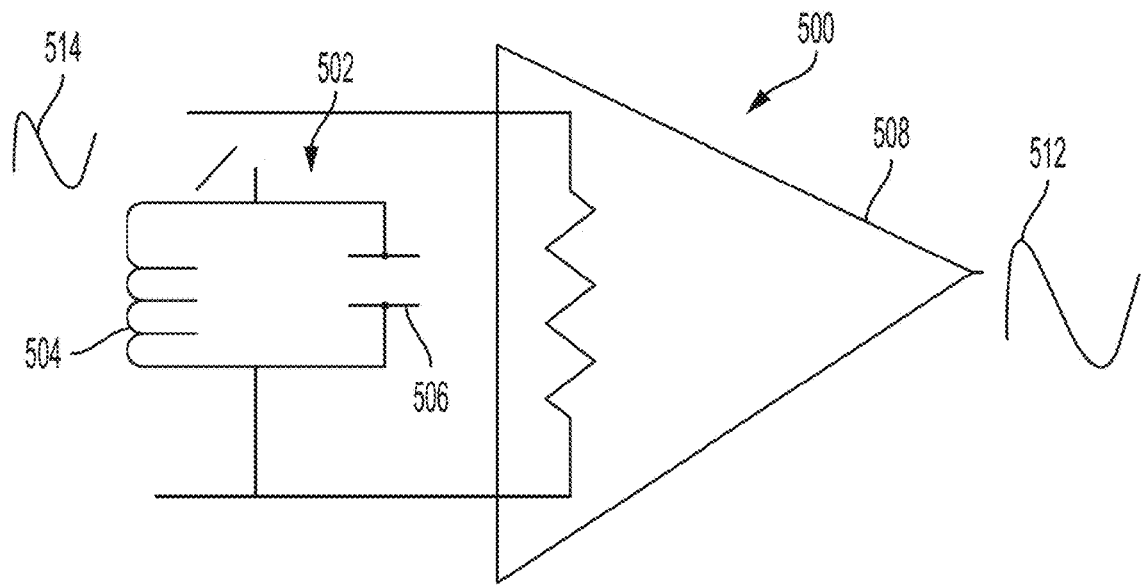
FIG. 5 is a schematic diagram of circuitry operating at a resonant frequency that can be included in one or both of a surface assembly or a downhole transceiver in an EM telemetry communication system according to one aspect of the present disclosure.

FIG. 5 is a schematic diagram of circuitry 500 operating at a resonant frequency that can be included in one or both of a surface assembly or a downhole transceiver in an EM telemetry communication system according to one example. At the resonant frequency, the resonant circuit 502 can provide very high impedance (and infinite impedance in ideal operating conditions). As an example in determining high impedance, the inductor 504 can have a value of 1000 H, the capacitor 506 can have a value of 0.1 µF, and the resonant frequency can be 15.91 Hz. Reactance of the inductor can be determined by the following equation (1):

$$X_L = 2\pi f L = 2\pi (15.91 \text{ Hz})(1000) = 100{,}000 \ \Omega \quad (1)$$

Reactance of the capacitor can be determined by the following equation (2):

$$X_C = 1/(2\pi f C) = 1/(2\pi (15.91 \text{ Hz})(0.1 \ \mu F)) = 100{,}000 \ \Omega \quad (2)$$

Parallel impedance of the resonant circuit 502 can then be determined using the following equation (3):

$$Z_{parallel} = \cfrac{1}{\cfrac{1}{Z_L} + \cfrac{1}{Z_C}} \quad (3)$$

$$Z_{parallel} = \cfrac{1}{\cfrac{1}{100{,}000 \ \Omega \angle 90°} + \cfrac{1}{100{,}000 \ \Omega \angle -90°}} = \frac{1}{0}$$

Where $Z_{parallel}$ is equal to 1/0, or undefined, this means the impedance of the resonant circuit 502 is approaching infinity, and therefore acts similar to an open circuit. Other inductance, capacitance, and resonant frequency values can be chosen depending on the application. The high impedance can help maximize the gain of an input EM signal 514 at the resonant frequency. Based on the resonant frequency determined by the resonant circuit 402, noise 410 can be shunted to ground as depicted in FIG. 4. Simultaneously, an input EM signal 514 corresponding to the resonant frequency can be passed to the amplifier 508 for amplification into the output EM signal 512 as depicted in FIG. 5. The amplifier 508, which can have high input impedance, can experience a reduced current demand in detecting signals with very low amplitude levels.

Figure 6:
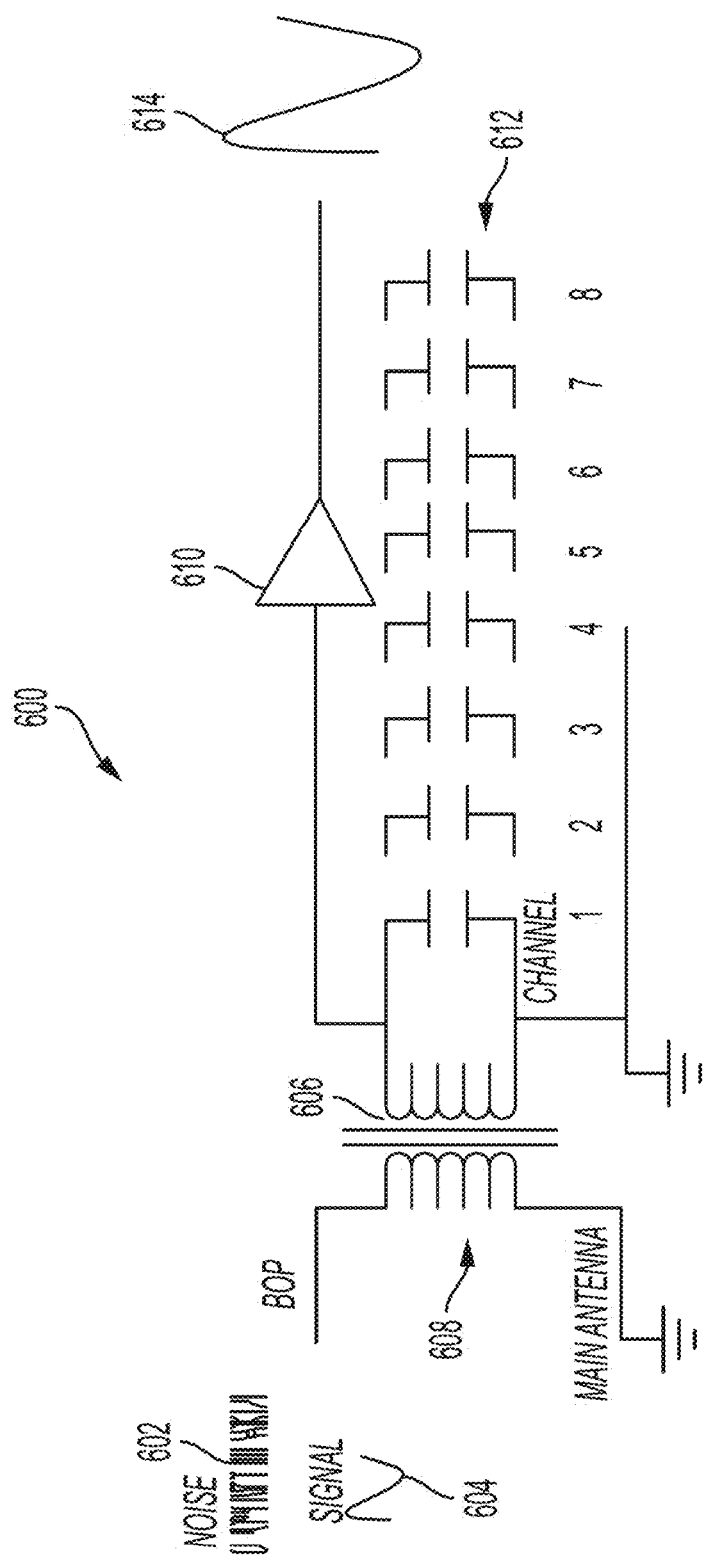
FIG. 6 is a schematic diagram of circuitry with configurable resonant frequency that can be included in one or both of a surface assembly or a downhole transceiver in an EM telemetry communication system according to one aspect of the present disclosure.

FIG. 6 is a schematic diagram of circuitry 600 that can be included in one or both of a surface assembly or a downhole transceiver in an EM telemetry communication system according to one example. The circuitry 600 depicts a more detailed version of a resonant circuit and amplifier configuration as previously described in FIGS. 4 and 5.

In some examples, the circuitry 600 can include a set of capacitors 612. Each capacitor within the set of capacitors 612 can represent a selectable channel where each channel corresponds to a different valued capacitor. Each capacitor within the set of capacitors 612 can be selected to configure the circuitry 600 to operate at a specific resonant frequency. For example, capacitors within the set of capacitors 612 can be selected to configure the circuitry 600 to operate at resonant frequencies including 2.055 Hz, 3.66 Hz, 4.981 Hz, 6.552 Hz, and 15.6 Hz. In some examples, the channels can be selected by various mechanisms including a rotary switch, a capacitor decade box with toggle switches, or relays.

The transformer 606 can be a magnetometer, with for example, a value of 1,000 H or 1,300 H. The transformer 606 can contain a Muonium metal core. The primary side of the transformer 606 can include multiple taps 608. For example, the primary side of the transformer 606 can have 10,000 turns or windings. Multiple taps 608, or wires, can be connected in electrical communication with the transformer 606, such as taps at 2,000 windings, 4,000 windings, 6,000 windings, and 8,000 windings. The transformer 606 can be configured to operate at a specific tap, as opposed to utilizing the total amount of windings, such that a tap may provide a cleaner EM signal for input to the amplifier 610 depending on the resonant frequency selected, or may affect the achieved gain.

The input line, which may be a BOP line, can receive noise 602 and an EM signal 604 and transmit both across a transformer 606. Depending on the resonant frequency determined by the selected capacitor from the set of capacitors 612, the noise 602 can be diverted to ground and the EM signal 604 can be passed to an amplifier 610 as similarly described in previous embodiments. As a result, the EM signal 604 is amplified into an output EM signal 614, which was previously separated from noise using the resonant circuitry of circuitry 600. In some examples, the output EM signal 614 can be transmitted to a bandpass filter for further amplification and reduction of noise prior to processing the EM signal.

In some examples, additional circuit components may be included in the circuitry 600 to increase the sensitivity of the transformer 606. For example, adding a junction gate field-effect transistor ("JFET") to the input of the primary side of the inductor windings can increase the sensitivity of the transformer 606. The addition of this JFET can increase the input impedance the resonant circuit is subjected to, which can improve the Q-factor of the output EM signal 614. For example, the output EM signal 614 may have a gain of 30 dB when the circuitry 600 does not include the JFET circuitry, and may have a gain of 50 dB when the circuitry 600 does include the JFET circuitry. Improving the Q-factor of the output EM signal 614 can produce a stronger signal that can simplify signal processing.

Figure 7:
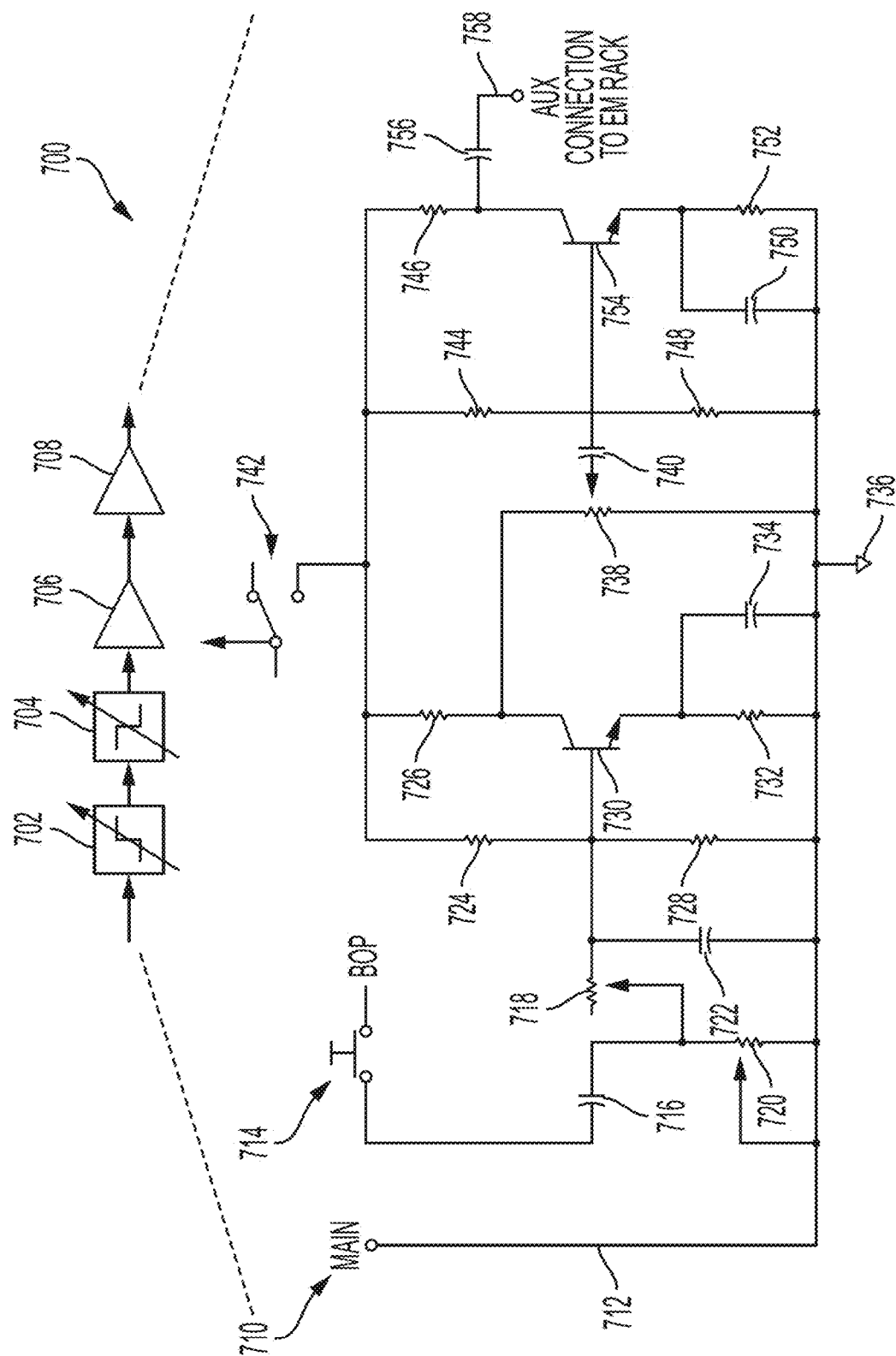
FIG. 7 is a schematic diagram of a bandpass filter circuitry that can be included in one or both of a surface assembly or a downhole transceiver in an EM telemetry communication system according to one aspect of the present disclosure.

FIG. 7 is a schematic diagram of a bandpass filter implemented in a circuit 710 that can be included in one or both of a surface assembly or a downhole transceiver in an EM telemetry system according to one example. Specifically, FIG. 7 shows a circuit 710 that implements an adjustable high-pass filter 702, an adjustable low-pass filter 704, a first amplifier 706, and a second amplifier 708. The circuit 710 comprises a common connection MAIN 712; a switch 714 through which an incoming signal (e.g., an EM signal that has been cleaned by a resonant circuit and amplified by an amplifier) passes to be filtered and amplified by the circuit 710; capacitor 716 (e.g., 50 micro-farads); potentiometers 718, 720 (e.g., 5 kilo-ohms); capacitor 722 (e.g., 50 micro-farads); resistors 724 (e.g., 142.4 kilo-ohms), 726 (e.g., 7.4 kilo-ohms), 728 (e.g., 15.1 11 kilo-ohms); n-p-n bipolar junction transistor 730; resistor 732 (e.g., 792 ohms); capacitor 734 (e.g., 1005 micro-farads); ground connection 736; potentiometer 738 (e.g., 10 kilo-ohms); capacitor 740 (e.g., 100 micro-farads); switch 742 to a voltage source; resistors 744 (e.g., 71.2 kilo-ohms), 646 3.7 kilo-ohms), 748 (e.g., 7.555 kilo-ohms); capacitor 750 (e.g., 2009 micro farads); resistor 752 (e.g., 396 ohms); n-p-n bipolar junction transistor 754; capacitor 756 (e.g., 100 micro-farads); and output connection 758 that couples, for instance, to an auxiliary ("AUX") input on an EM rack. The foregoing component values (e.g., resistance and capacitance values) are simply illustrative, and in practice, the actual component values may be selected based on the closest available component values or they may be different values altogether.

In general, the operation of the circuit 710 includes the high-pass filtering of an incoming signal by components 716, 720; the low-pass filtering of the signal by components 718, 722; the amplification of the filtered signal using components 724, 726, 728, 730, 732, and 734, which results in a phase-inverted and amplified signal that is provided to the component 738; adjustment of gain by component 738; a DC block by component 740; further amplification and phase-inversion by components 744, 746, 748, 750, 752, and 754; and another DC block by component 756. Thus, the circuit 710 receives a relatively weak signal, and filters the signal to be within a certain passband using high-pass and low-pass filters. The circuit then amplifies the signal once, which results in a stronger signal with an undesirable 180-degree phase inversion, and amplifies the signal once again, which results in an even stronger signal that is again inverted by 180 degrees back to the incoming signal's original phase. The resulting signal may be used as desired—for example, it may be provided to an AUX connection on an EM rack via connection 758.

Figure 8:
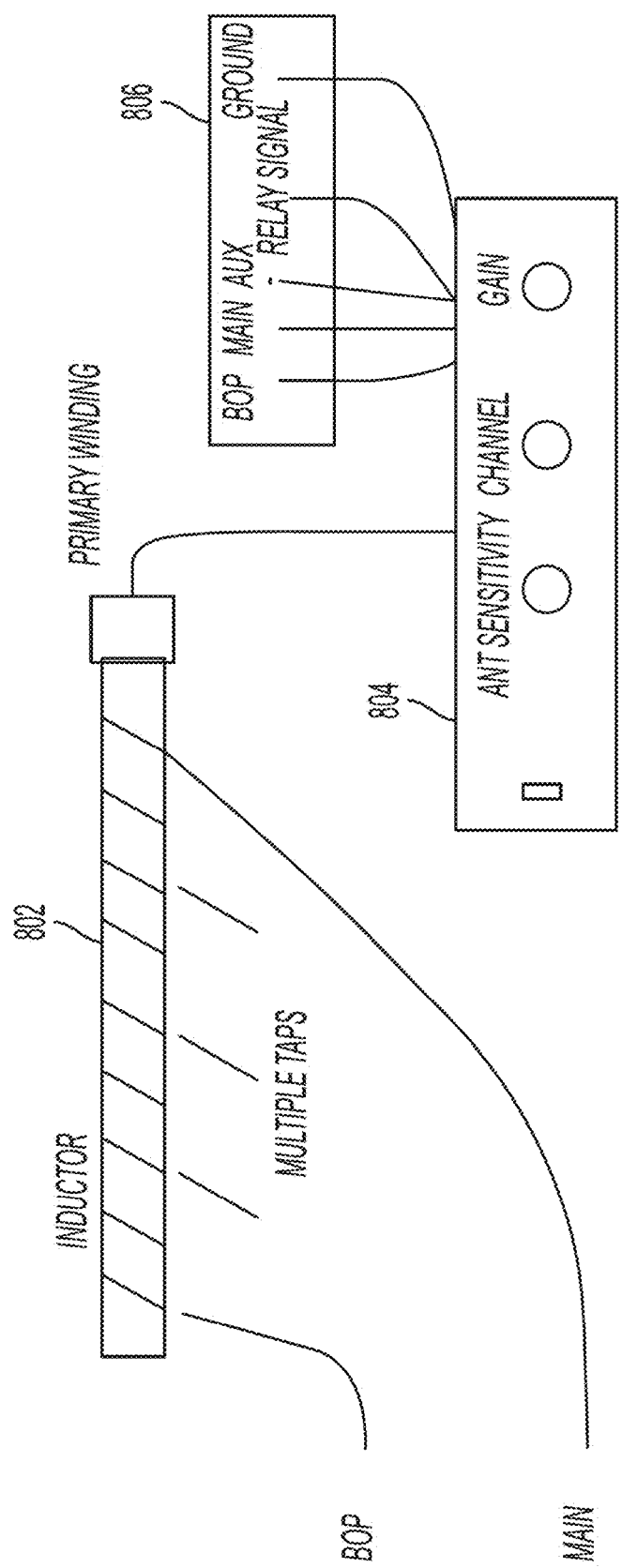
FIG. 8 is a schematic diagram depicting an example of a rack, controls, and antennas for use in transmitting or receiving and processing an EM signal in an EM telemetry communication system according to one aspect of the present disclosure.

FIG. 8 is a schematic diagram depicting an example of a rack, controls, and antennas for use in transmitting, receiving, and/or processing an EM signal in an EM telemetry system according to one example. An additional rack for an EM telemetry system can be added to route EM signal input lines (e.g., BOP line) and main lines in a normal manner when downlinking. FIG. 8 depicts an example of an inductor 802 connected to BOP and main antennas, controls 804, and rack 806 for use in transmitting, receiving, and/or processing EM signals. The rack 806 can be a Sperry's EMSS rack.

During uplink, relays can isolate the BOP and main antennas from the back of the rack 806. The antennas can be routed to the secondary winding on the inductor 802. The EM signal can be transferred via electromagnetic induction to primary windings. The inductor 802 can include multiple taps on the secondary winding to adjust the antenna's sensitivity, which can help remove unwanted noise on stronger EM signals. This setup can reduce noise and improve frequency selection as compared to connecting the antennas directly to the primary windings of the inductor 802. An interface of the control 804 can allow the operator to choose the uplink channel, the antenna's sensitivity, and the output gain of the amplifier.

Antenna selection can be setup for BOP and AUX. This setup can automatically downlink through the BOP and the main antennas, and uplink through the AUX connection on the back of the rack 806. The ground wire from the antennas' hardware can be connected to the rack 806 to connect the resonant circuity to virtual ground in the receive board of the rack 806. Safety is not compromised by adding the hardware.

Figure 9:
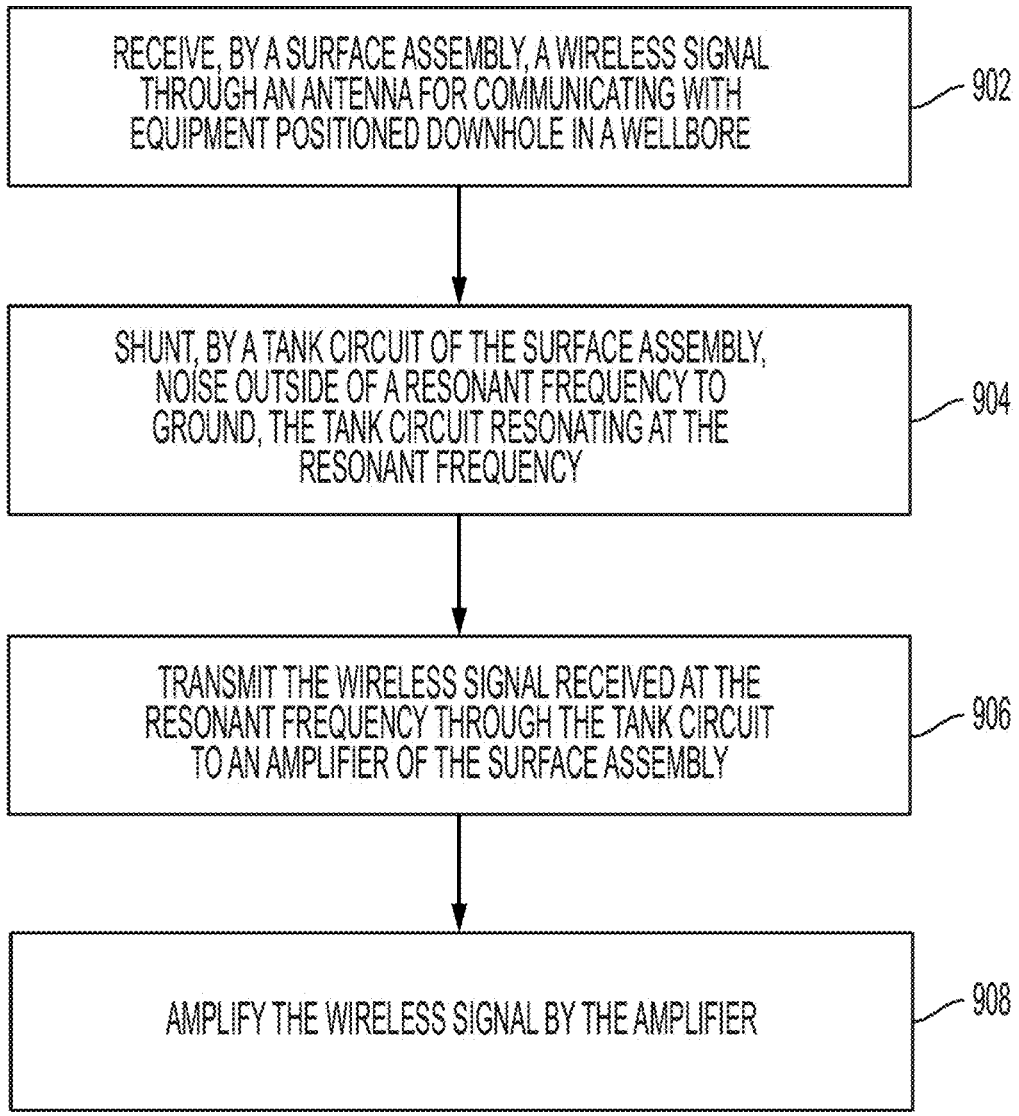
FIG. 9 is a flowchart of a process for using a resonant receiver for EM telemetry of wellbore-related data according to one aspect of the present disclosure.

FIG. 9 is a flowchart of a process for using a resonant receiver for EM telemetry of wellbore-related data according to one example. Some processes for implementing a resonant receiver for EM telemetry of wellbore-related data can be described according to previous examples.

In block 902, a wireless signal is received by a surface assembly through an antenna for communicating with equipment positioned downhole in a wellbore. The wireless signal can be an EM signal communicated through EM telemetry. EM telemetry in the context of a wellbore environment can involve communicating weak signals through a subterranean formation that are susceptible to noise. A surface assembly can be used to detect and isolate the EM signals from amongst the noise propagating throughout a wellbore environment. In some examples, the wireless signal can be received by the surface assembly by first travelling through a completed well casing that can act as a conductive antenna within the subterranean formation.

In some examples, the equipment in wireless communication with the surface assembly can be a downhole transceiver that can wirelessly transmit and receive signals with the antenna. The downhole transceiver can communicate unilaterally or bilaterally with the surface assembly for transmitting or receiving information related to the wellbore. Such information can include sensory information about wellbore conditions, commands directing drilling tools to change an operational characteristic or configuration, or any other wellbore related information.

In block 904, noise outside of a resonant frequency is shunted to ground by a tank circuit of the surface assembly. The tank circuit can resonate at a resonant frequency to allow for magnification of an EM signal being transmitted or received at that resonant frequency. Other EM signals or any other type of signal not operating at the resonant frequency can be shunted to ground, therefore allowing the surface assembly to isolate signals at a specific frequency. The resonant frequency can be configured by selecting a capacitor from a set of capacitors for use in the tank circuit. Each capacitor from the set of capacitors can cause the tank circuit to resonate at different resonant frequencies. This can allow the surface assembly to selectively transmit or receive EM signals corresponding to a desired resonant frequency.

In block 906, the wireless signal received at the resonant frequency is transmitted past the tank circuit to an amplifier of the surface assembly. Once the tank circuit isolates an EM signal being transmitted or received at the desired resonant frequency, the surface assembly can pass the received EM signal to an amplifier for further signal preprocessing.

In block 908, the wireless signal is amplified by the amplifier of the surface assembly. After having been isolating from unwanted noise, the EM signal can be amplified in preparation of signal processing. This amplification can help make processing of the wireless signal easier, since EM signals are generally of low signal strength. In some examples, the amplifier can be a high-gain, low-noise amplifier. Additional preprocessing can be performed using a bandpass filter. For example, after being amplified by the amplifier, the wireless signal can be transmitted from the amplifier to a bandpass filter. The bandpass filter can filter additional noise that was not able to be shunted to ground by the tank circuit. The bandpass filter can also further amplify the wireless signal to a level required by any processing circuitry. The resulting filter signal can then be demodulated and decoded to determine information related to the wellbore.

In some aspects, systems, devices, and methods for a resonant receiver for electromagnetic telemetry of wellbore-related data are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a surface assembly with an antenna for wirelessly communicating signals with equipment positioned downhole in a wellbore, the surface assembly comprising: an amplifier; and a tank circuit operable to resonate at a resonant frequency to pass a received signal at the resonant frequency to the amplifier and shunt noise outside of the resonant frequency to ground.

Example 2 is the system of example 1, wherein the equipment is a downhole transceiver operable to wirelessly transmit and receive signals with the antenna.

Example 3 is the system of example 2, wherein the downhole transceiver comprises: a downhole amplifier; and a downhole tank circuit operable to resonate at the resonant frequency to pass a downhole received signal at the resonant frequency to the downhole amplifier and shunt noise outside of the resonant frequency to ground.

Example 4 is the system of any of examples 1-3, wherein the system is electromagnetic (EM) telemetry communication system.

Example 5 is the system of any of examples 1-4, wherein the tank circuit includes a set of capacitors, the tank circuit being configurable to use a capacitor from the set of capacitors, each capacitor from the set of capacitors causing the tank circuit to resonate at different resonant frequencies.

Example 6 is the system of any of examples 1-5, wherein the surface assembly is electrically connected to a wellhead of a second wellbore proximate to the wellbore such that a well casing connected to the wellhead of the second wellbore is operable to function as a subterranean antenna for wirelessly communicating signals with the equipment.

Example 7 is the system of any of examples 1-6, wherein the amplifier is a high-gain, low-noise amplifier.

Example 8 is the system of any of examples 1-7, the surface assembly further comprising: a bandpass filter to filter and amplify an amplified signal received from the amplifier in preparation of signal processing.

Example 9 is an assembly comprising: a transceiver for wirelessly communicating signals through a subterranean formation within a wellbore environment; an amplifier; and a tank circuit operable to resonate at a resonant frequency to pass a received signal at the resonant frequency to the amplifier and shunt noise outside of the resonant frequency to ground.

Example 10 is the assembly of example 9, wherein the signals are electromagnetic (EM) signals communicated using EM telemetry.

Example 11 is the assembly of any of examples 9-10, wherein the tank circuit includes a set of capacitors, the tank circuit being configurable to use a capacitor from the set of capacitors, each capacitor from the set of capacitors causing the tank circuit to resonate at different resonant frequencies.

Example 12 is the assembly of any of examples 9-11, wherein the transceiver is operable to wirelessly communicate signals through the subterranean formation through a well casing connected to a wellhead of a wellbore, wherein the well casing is operable to function as a subterranean antenna for wirelessly communicating signals with the transceiver.

Example 13 is the assembly of any of examples 9-12, wherein the amplifier is a high-gain, low-noise amplifier.

Example 14 is the assembly of any of examples 9-13, the assembly further comprising: a bandpass filter to filter and amplify an amplified signal received from the amplifier in preparation of signal processing.

Example 15 is a method comprising: receiving, by a surface assembly, a wireless signal through an antenna for communicating with equipment positioned downhole in a wellbore; shunting, by a tank circuit of the surface assembly, noise outside of a resonant frequency to ground, the tank circuit resonating at the resonant frequency; transmitting the wireless signal received at the resonant frequency through the tank circuit to an amplifier of the surface assembly; and amplifying, by the amplifier, the wireless signal.

Example 16 is the method of example 15, wherein the equipment is a downhole transceiver that wirelessly transmits and receives signals with the antenna.

Example 17 is the method of any of examples 15-16, wherein the wireless signal is an electromagnetic (EM) signal communicated using EM telemetry.

Example 18 is the method of any of examples 15-17, further comprising: configuring the resonant frequency by selecting a capacitor from a set of capacitors for use in the tank circuit, each capacitor from the set of capacitors causing the tank circuit to resonate at different resonant frequencies.

Example 19 is the method of any of examples 15-18, wherein the amplifier is a high-gain, low-noise amplifier.

Example 20 is the method of any of examples 15-19, further comprising: filtering, by a bandpass filter of the surface assembly, the wireless signal amplified by the amplifier in preparation of signal processing.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a surface assembly with an antenna for wirelessly communicating signals at a frequency of less than 50 hz to equipment positioned downhole in a wellbore, the surface assembly comprising:
a counter electrode coupleable to a wellhead for generating a voltage differential between the counter electrode and the wellhead to transmit or receive signals;
an amplifier; and
a tank circuit operable to resonate at a resonant frequency to pass a received signal at the resonant frequency to the amplifier and shunt noise outside of the resonant frequency to ground.

2. The system of claim 1, wherein the equipment is a downhole transceiver operable to wirelessly transmit and receive signals with the antenna.

3. The system of claim 2, wherein the downhole transceiver comprises:
a downhole amplifier; and
a downhole tank circuit operable to resonate at the resonant frequency to pass a downhole received signal at the resonant frequency to the downhole amplifier and shunt noise outside of the resonant frequency to ground.

4. The system of claim 1, wherein the system is electromagnetic (EM) telemetry communication system.

5. The system of claim 1, wherein the tank circuit includes a set of capacitors, the tank circuit being configurable to use a capacitor from the set of capacitors, each capacitor from the set of capacitors causing the tank circuit to resonate at different resonant frequencies.

6. The system of claim 1, wherein the surface assembly is electrically connected to the wellhead of a second wellbore proximate to the wellbore such that a well casing connected to the wellhead of the second wellbore is operable to function as a subterranean antenna for wirelessly communicating signals with the equipment.

7. The system of claim 1, wherein the amplifier is a high-gain, low-noise amplifier.

8. The system of claim 1, the surface assembly further comprising:
a bandpass filter to filter and amplify an amplified signal received from the amplifier in preparation of signal processing.

9. An assembly comprising:
a transceiver for wirelessly communicating signals at a frequency of less than 50 hz through a subterranean formation within a wellbore environment;
a counter electrode coupleable to a wellhead for generating a voltage differential between the counter electrode and the wellhead to transmit or receive signals;
an amplifier; and
a tank circuit operable to resonate at a resonant frequency to pass a received signal at the resonant frequency to the amplifier and shunt noise outside of the resonant frequency to ground.

10. The assembly of claim 9, wherein the signals are electromagnetic (EM) signals communicated using EM telemetry.

11. The assembly of claim 9, wherein the tank circuit includes a set of capacitors, the tank circuit being configurable to use a capacitor from the set of capacitors, each capacitor from the set of capacitors causing the tank circuit to resonate at different resonant frequencies.

12. The assembly of claim 9, wherein the transceiver is operable to wirelessly communicate signals through the subterranean formation through a well casing connected to the wellhead of a wellbore, wherein the well casing is operable to function as a subterranean antenna for wirelessly communicating signals with the transceiver.

13. The assembly of claim 9, wherein the amplifier is a high-gain, low-noise amplifier.

14. The assembly of claim 9, the assembly further comprising:
a bandpass filter to filter and amplify an amplified signal received from the amplifier in preparation of signal processing.

15. A method comprising:
receiving, by a surface assembly comprising a counter electrode coupled to a wellhead for generating a voltage differential between the counter electrode and the wellhead to transmit or receive signals, a wireless signal at a frequency of less than 50 hz through an antenna for communicating with equipment positioned downhole in a wellbore;
shunting, by a tank circuit of the surface assembly, noise outside of a resonant frequency to ground, the tank circuit resonating at the resonant frequency;
transmitting the wireless signal received at the resonant frequency through the tank circuit to an amplifier of the surface assembly; and
amplifying, by the amplifier, the wireless signal.

16. The method of claim 15, wherein the equipment is a downhole transceiver that wirelessly transmits and receives signals with the antenna.

17. The method of claim 15, wherein the wireless signal is an electromagnetic (EM) signal communicated using EM telemetry.

18. The method of claim 15, further comprising:
configuring the resonant frequency by selecting a capacitor from a set of capacitors for use in the tank circuit, each capacitor from the set of capacitors causing the tank circuit to resonate at different resonant frequencies.

19. The method of claim 15, wherein the amplifier is a high-gain, low-noise amplifier.

20. The method of claim 15, further comprising:
filtering, by a bandpass filter of the surface assembly, the wireless signal amplified by the amplifier in preparation of signal processing.

* * * * *